(12) United States Patent
Komiya

(10) Patent No.: US 7,306,867 B2
(45) Date of Patent: Dec. 11, 2007

(54) PROTON CONDUCTIVE SOLID POLYMER ELECTROLYTE

(75) Inventor: Teruaki Komiya, Fujimi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 566 days.

(21) Appl. No.: 10/616,537

(22) Filed: Jul. 9, 2003

(65) Prior Publication Data

US 2004/0013925 A1    Jan. 22, 2004

(30) Foreign Application Priority Data

Jul. 10, 2002    (JP) ............................. 2002-201718

(51) Int. Cl.
H01M 8/10    (2006.01)

(52) U.S. Cl. .................. 429/33; 429/306; 429/314; 429/304; 521/27

(58) Field of Classification Search ............... 429/33, 429/306, 314, 304; 521/27
See application file for complete search history.

(56) References Cited

U.S. PATENT DOCUMENTS

| 3,841,492 | A | * | 10/1974 | Brinegar ................ 264/41 |
| 5,525,436 | A | | 6/1996 | Savinell et al. ............ 429/30 |
| 6,124,060 | A | | 9/2000 | Akita et al. ................ 429/307 |
| 6,264,857 | B1 | | 7/2001 | Kreuer et al. |
| 2002/0045090 | A1 | | 4/2002 | Oyanagi et al. |

FOREIGN PATENT DOCUMENTS

| DE | 19632285 | 2/1998 |
| JP | 9-87369 | 3/1997 |
| JP | 11-503262 | 3/1999 |
| JP | 2000-517462 A1 | 12/2000 |
| JP | 2001160407 A | 6/2001 |
| JP | 2001-236973 | 8/2001 |
| JP | 2002-15755 A2 | 1/2002 |
| WO | WO 96/13872 A1 | 5/1996 |
| WO | WO 01/63683 A2 | 8/2001 |

OTHER PUBLICATIONS

Kreuer et al. "Imidazole and pyrazole-based proton conducting polymers and liquids." *Electronichimica Acta* 1998;43(10-11):1281-8.

Schechter et al. "Imidazole and 1-methyl imidazole in phosphoric acid doped polybenzimidazole, electrolyte for fuel cells." *Solid State Ionics* 2002;147:181-7.

Yang et al. "Approaches and technical challenges to high temperature operation of proton exchange membrane fuel cells." *Journal of Power Sources* 2001;103:1-9.

(Continued)

*Primary Examiner*—Laura Weiner
(74) *Attorney, Agent, or Firm*—Lahive & Cockfield, LLP; Anthony A. Laurentano, Esq.

(57) ABSTRACT

A material such as imidazole (nitrogen-containing heterocyclic compound), which has at least one lone pair, is dispersed in a basic solid polymer such as polybenzimidazole. The mole number of imidazole per gram of polybenzimidazole is less than 0.0014 mol, preferably less than 0.0006 mol. The basic solid polymer is impregnated with an acidic inorganic liquid such as phosphoric acid and sulfuric acid to prepare a proton conductive solid polymer electrolyte.

14 Claims, 3 Drawing Sheets

|  | MOLE NUMBER OF PHOSPHORIC ACID PER REPEATING UNIT OF PBI IN MEMBRANE | MOLE NUMBER OF IMIDAZOLE PER GRAM OF PBI (mol/g) | PROTON CONDUCTIVITY (S/cm) | RATIO OF IMPROVEMENT IN PROTON CONDUCTIVITY (%) |
|---|---|---|---|---|
| COMPARATIVE EXAMPLE | 12.9 | 0 | 0.100 | – |
| EXAMPLE 1 | 12.7 | 0.00012 | 0.127 | 27 |
| EXAMPLE 2 | 12.9 | 0.00025 | 0.133 | 33 |
| EXAMPLE 3 | 12.9 | 0.00051 | 0.113 | 13 |

OTHER PUBLICATIONS

Japanese Office Action for Application No. 2002-201718, dated Aug. 8, 2006.

Schechter, Alex et al., "Imidazole and 1-methyl imidazole in phosphoric acid doped polybenzimidazole, electrolyte for fuel cells," *Solid State Ionics*, vol. 147:181-187 (2002).

Wainright, J.S. et al., "Acid Doped Polybenzimidazoles, A New Polymer Electrolyte," *Proceedings of the Symposium on Electrode Materials and Processes for Energy Conversion and Storage*, vol. 94(23):255-264 (1994).

European Search Report for Application No. 03254383.7—1227, dated Oct. 17, 2006.

* cited by examiner

| | MOLE NUMBER OF PHOSPHORIC ACID PER REPEATING UNIT OF PBI IN MEMBRANE | MOLE NUMBER OF IMIDAZOLE PER GRAM OF PBI (mol/g) | PROTON CONDUCTIVITY (S/cm) | RATIO OF IMPROVEMENT IN PROTON CONDUCTIVITY (%) |
|---|---|---|---|---|
| COMPARATIVE EXAMPLE | 12.9 | 0 | 0.100 | - |
| EXAMPLE 1 | 12.7 | 0.00012 | 0.127 | 27 |
| EXAMPLE 2 | 12.9 | 0.00025 | 0.133 | 33 |
| EXAMPLE 3 | 12.9 | 0.00051 | 0.113 | 13 |

PROTON CONDUCTIVE SOLID POLYMER ELECTROLYTE

BACKGROUND OF THE INVENTION

1. Field of the Invention

The present invention relates to a proton conductive solid polymer electrolyte to be used for an electrochemical cell including, for example, a fuel cell and a hydrogen and oxygen generator for generating hydrogen and oxygen by electrolyzing water.

2. Description of the Related Art

In the fuel cell, for example, an electrolyte is interposed between an anode to which fuel gas containing hydrogen is supplied and a cathode to which oxygen-containing gas such as air is supplied. In the electrolyte, hydrogen ion (proton), which is generated by ionizing hydrogen contained in the fuel gas on the anode, is moved to the cathode. In other words, the electrolyte serves as a proton conductor in the fuel cell.

A material obtained by humidifying a perfluorosulfonic acid polymer membrane with liquid water is widely known as an example of the proton conductor which acts as the electrolyte of the fuel cell. However, the proton conductivity of the membrane is lowered as the membrane is dried. Accordingly, in order to maintain the power generation characteristics of the fuel cell, the membrane is prevented from being dried by adding steam to the fuel gas and/or the oxygen-containing gas to continuously supply the membrane with water, and supplying a cooling medium into the fuel cell to maintain the operation temperature at 80 through 90° C.

Recently, a composite electrolyte comprising a base material of basic solid polymer such as polybenzimidazole is proposed. The base material is doped or impregnated with inorganic strong acid liquid such as phosphoric acid (see U.S. Pat. No. 5,525,436 and Japanese Laid-Open Patent Publication No. 11-503262 (PCT)). Another composite electrolyte comprises a base material of meta-polyaniline and is prepared in the same manner as described above (see Japanese Laid-Open Patent Publication No. 2001-160407).

The two types of the composite electrolytes described above have high proton conductivities even in a dried state. Therefore, it is unnecessary to use any humidifier. Further, it is sufficient to use a small-scale cooling system, because the fuel cell can be operated at high temperature. Therefore, the fuel cell system can be structured simply, and it is possible to realize a small size. As described above, it is advantageous to adopt the electrolyte which is excellent in proton conductivity. Accordingly, it has been vigorously tried to develop electrolytes which are excellent in proton conductivity.

For example, K. D. Kreuer et al. reported that a material, which is obtained by adding imidazole to polyetherketone sulfonic acid as an acidic polymer, has a proton conductivity of about 0.01 S/cm at 160° C. in a dried state, in J. Maier. Electrochimica (1998), Vol. 43, pp. 1281-1288.

C. Yang et al. reported that a material, which is obtained by adding imidazole to Nafion as an acidic polymer (trade name of perfluorosulfonic acid polymer membrane produced by DuPont), exhibits a proton conductivity of 0.08 to 0.09 S/cm at 160° C. in a dried state, in J. Power Sources (2001), Vol. 103, pp. 1-9.

Japanese Laid-Open Patent Publication No. 2001-236973 discloses a solid polymer electrolyte comprising a main polymer which is acidic or basic and a subsidiary polymer which is capable of forming an acid/base composite structure together with the main polymer. The subsidiary polymer is disposed into portions of the main polymer other than acidic or basic portions thereof. For example, it is described that a material, which is obtained by doping or impregnating Nafion with polyethyleneimine, exhibits a value of $1.7 \times 10^{-3}$ S/cm at 150° C.

It is sincerely desired to obtain an electrolyte having a proton conductivity which is much more excellent that those of the electrolytes as described above.

SUMMARY OF THE INVENTION

A. Schechter et al. reported results of studies in relation to the proton conductivity of a composite electrolyte obtained as a composite material such that a membrane of polybenzimidazole as a basic solid polymer is doped or impregnated with an imidazolinium salt solution prepared by adding 1-methylimidazole to phosphoric acid having a concentration of 85% in an amount of 0.0019 to 0.0117 mol per gram of the membrane, in Solid State Ionics (2002), Vol. 147, pp. 181-187. This report says that the addition of 1-methylimidazole to polybenzimidazole and phosphoric acid does not contribute to the improvement in proton conductivity.

However, 1-methylimidazole has the lone pair. The lone pair acts as the proton accepter. Therefore, it is presumed that the proton conductivity is essentially improved when 1-methylimidazole is added to polybenzimidazole.

As a result of the investigation performed by the present inventors based on this presumption, it has been found out that the proton conductivity of a polymer membrane is improved by controlling the amount of addition of a material which acts as the proton accepter to the polymer membrane.

A principal object of the present invention is to provide a proton conductive solid polymer electrolyte which has an excellent proton conductivity and which improves the characteristics of electrochemical cells.

According to one aspect of the present invention, there is provided a proton conductive solid polymer electrolyte comprising a basic solid polymer as a base material, the base material being impregnated with an acidic inorganic liquid, wherein:

a material, which has at least one lone pair, is dispersed in the base material; and a mole number of the material per gram of the base material is less than 0.0014 mol.

When the proton conductive solid polymer electrolyte is constructed as described above, the obtained solid electrolyte has an excellent proton conductivity, for the following reason. The proton is successively attracted by the lone pair of the material, and hence the movement of proton is assisted.

The proton is promptly moved in the solid electrolyte which has the excellent proton conductivity. Accordingly, the internal resistance is reduced, for example, in a fuel cell or an electrolysis apparatus which adopts, as the electrolyte, the proton conductive solid polymer electrolyte according to the present invention. Therefore, it is possible to improve power generation characteristics and decomposition efficiency.

In this aspect, it is preferable that the solid polymer is a polymer which has a structural unit of secondary amine monomer, in view of the excellent ability to retain an acidic inorganic liquid, the difficulty of gas permeation, and high strength.

Preferred examples of the polymer as described above may include polymers represented by the following chemical formulas (1) to (4):

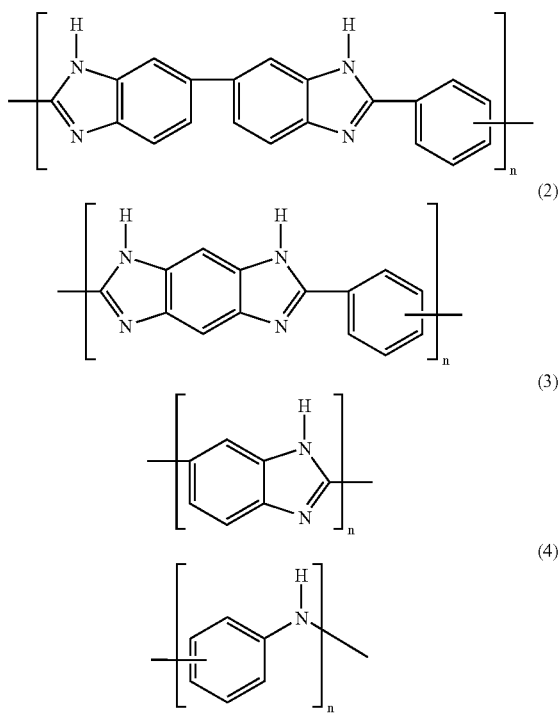

(1)
(2)
(3)
(4)

Preferred examples of the material which has at least one lone pair may include a compound having nitrogen-containing heterocyclic compound group, amino group, or imino group. Alternatively, the material may be a nitrogen-containing heterocyclic compound. It is a matter of course that two or more materials may be simultaneously used.

As for the acidic inorganic liquid, it is possible to choose phosphoric acid or sulfuric acid.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a table illustrating proton conductivities of the respective test pieces.

DESCRIPTION OF THE PREFERRED EMBODIMENTS

The proton conductive solid polymer electrolyte according to the present invention will be explained in detail below as exemplified by preferred embodiments with reference to the accompanying drawings.

Figure 1:
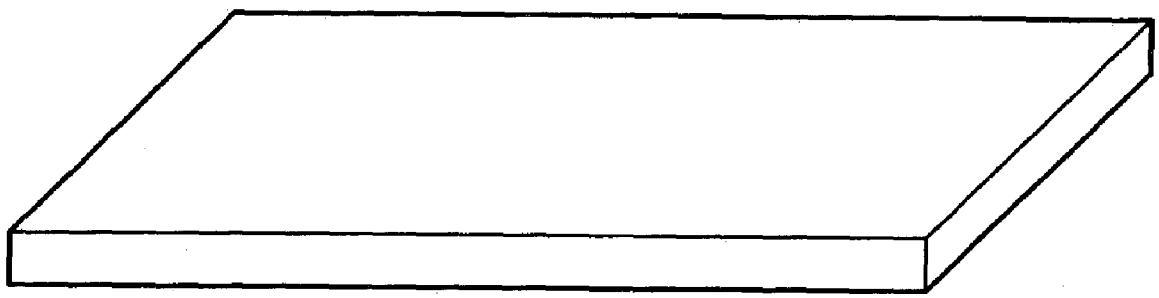
FIG. 1 is a perspective view schematically illustrating an entire proton conductive solid polymer electrolyte according to an embodiment of the present invention.

FIG. 1 shows a proton conductive solid polymer electrolyte according to an embodiment of the present invention. The proton conductive solid polymer electrolyte 10 is a thin membrane-like composite electrolyte comprising a basic solid polymer as a base material which is impregnated or doped with an unillustrated acidic inorganic liquid.

The basic solid polymer as the base material is not specifically limited provided that the basic solid polymer can be impregnated or doped with the liquid electrolyte to retain the liquid electrolyte therein. However, it is preferable to use basic solid polymer having the structural unit of the secondary amine monomer because of, for example, the excellent ability to retain the acidic inorganic liquid, the difficulty of gas permeation, and the high strength. The basic solid polymer as described above may include, for example, the materials represented by the following chemical formulas (1) to (4).

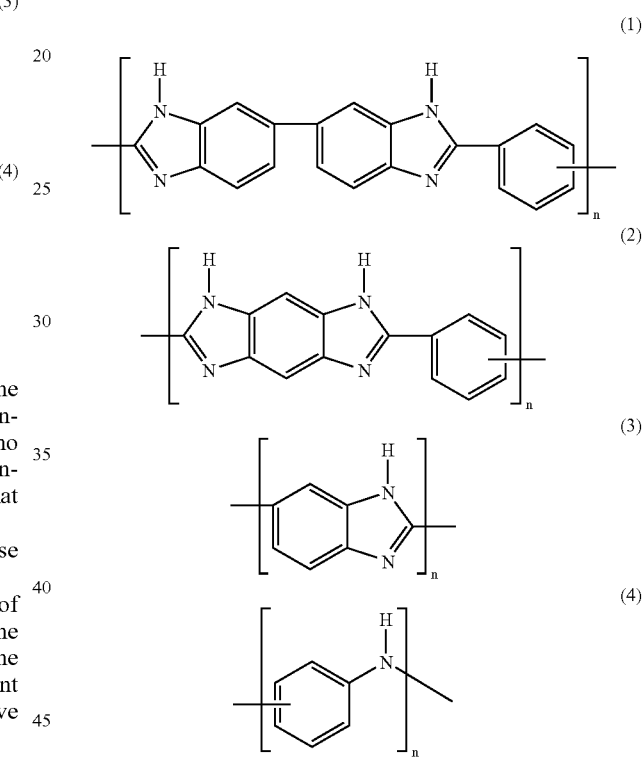

(1)
(2)
(3)
(4)

It is noted that one or more unillustrated lone pair materials (materials each of which has at least one lone pair) are dispersed in the base material. As described later on, the lone pair material acts as the proton accepter in the base material.

The lone pair material is not specifically limited provided that the lone pair material is chemically stable and it is not volatilized at temperatures of not less than 100° C. However, preferred examples may include compounds having nitrogen-containing heterocyclic compound group, amino group (—$NH_2$), or imino group (—NH). The lone pair material may be either liquid or solid.

Specified examples of the nitrogen-containing heterocyclic compound group include imidazole group, pyrazole group, and pyridine group represented by the following chemical formulas (5) to (7). In the following description, when the chemical formula of the lone pair material is illustrated, the major lone pair possessed by the material is also illustrated.

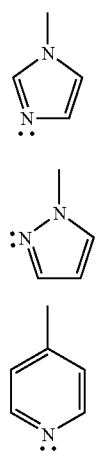

The compound having imidazole group, pyrazole group, or the pyridine group is exemplified by polyvinylimidazole, polyvinylpyrazole, and polyvinylpyridine represented by the following chemical formulas (8) to (10).

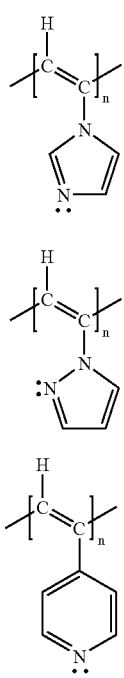

The compound having imino group is exemplified by polyethyleneimine represented by the following chemical formula (11).

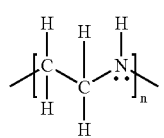

Other preferred examples of the lone pair material may include nitrogen-containing heterocyclic compounds. That is, the lone pair material may be imidazole, pyrazole, or pyridine represented by the following chemical formulas (12) to (14). Of course, the lone pair material may be diazine (pyridazine, pyrimidine, pyrazine), or it may be, for example, quinoline, isoquinoline, indole, or purine.

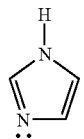

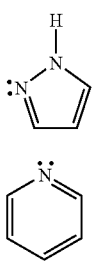

In the present invention, the lone pair material as described above is added in such a ratio that the mole number or number of mole contained per gram of the basic solid polymer is less than 0.0014 mol. If the lone pair material is added in a ratio of not less than 0.0014 mol, the proton conductivity of the proton conductive solid polymer electrolyte 10 is lowered. More preferably, the mole number per gram of the basic solid polymer is not more than 0.0006 mol.

The basic solid polymer (base material), in which the lone pair material is dispersed as described above, is further impregnated with the acidic inorganic liquid. It is enough for the acidic inorganic liquid that the movement of proton is not obstructed. For example, it is possible to choose phosphoric acid or sulfuric acid.

When the proton arrives at one end surface of the proton conductive solid polymer electrolyte 10 constructed as described above, then the proton is firstly attracted by the lone pair possessed by the first lone pair material existing in the vicinity of the end surface, and the proton is bonded to the lone pair by means of the van der Waals force. After that, the proton is attracted by the lone pair possessed by the second lone pair material existing in the vicinity of the first lone pair material. As a result, the proton is released from the first lone pair material, and the proton is bonded to the lone pair of the second lone pair material by means of the van der Waals force. The release and the bonding are successively repeated, and thus the proton is assisted for the movement from one end surface to the other end surface of the proton conductive solid polymer electrolyte 10. Consequently, the proton conductivity is improved.

Therefore, when the proton conductive solid polymer electrolyte 10 is adopted as a solid electrolyte of a fuel cell, the proton is promptly moved from the anode to the cathode. Therefore, for example, the internal resistance is decreased. Accordingly, it is possible to improve the power generation characteristics of the fuel cell.

Even in the electrochemical cells other than the fuel cell, such as a hydrogen and oxygen generator by electrolyzing water, it is possible to use the proton conductive solid polymer electrolyte 10 as a solid electrolyte.

The proton conductive solid polymer electrolyte 10 can be manufactured as follows.

At first, the basic solid polymer is dissolved in a solvent. When the basic solid polymer has the structural unit of the secondary amine monomer as described above, it is sufficient that dimethylacetamide and/or dimethylformamide is used, and the basic solid polymer is dissolved so that the ratio of the basic solid polymer is 5 to 15% by weight.

Subsequently, the lone pair material is added and dissolved in the solvent so that the mole number per gram of the basic solid polymer is less than. 0.0014 mol, preferably not more than 0.0006 mol.

The solvent, in which the basic solid polymer and the lone pair material are dissolved as described above, is cast on a smooth surface such as glass plate, and then the solvent is volatilized and removed by heating or vacuum evacuation. Accordingly, a membrane is obtained, in which the lone pair material is dispersed in the basic solid polymer.

The membrane is exfoliated from the glass plate, and then it is immersed in the acidic inorganic liquid such as phosphoric acid or sulfuric acid to allow the acidic inorganic liquid to permeate into the membrane. The membrane is taken out from the acidic inorganic liquid after a predetermined period of time, removing any excessive acidic inorganic liquid such as phosphoric acid or sulfuric acid adhered to the surface. Thus, the proton conductive solid polymer electrolyte 10 is obtained.

EXAMPLES

Powder of polybenzimidazole (hereinafter referred to as "PBI") was dissolved in an amount of 10% by weight in dimethylacetamide at 25° C. Imidazole in an amount of 0.00012 mol per gram of PBI was added to the solution, and then agitated while retaining the temperature at 25° C. to dissolve imidazole.

Subsequently, a glass plate, on which the solution had been cast, was placed on a hot plate, and retained at 40° C. for 12 hours. Further, the glass plate was retained at 120° C. for 6 hours in a vacuum dryer, and thus dimethylacetamide as the solvent was volatilized and removed to obtain a membrane having a thickness of 50 μm.

The membrane was exfoliated from the glass plate, and a test piece, which had sizes of length and width of 50 mm, was cut out from the membrane. The test piece was immersed in 200 ml of phosphoric acid having a concentration of 85%. The immersion was performed while sealing the container of the phosphoric acid, in order to avoid the moisture absorption of the phosphoric acid.

After 48 hours, the membrane was taken out from phosphoric acid, and excessive phosphoric acid adhered to the membrane surface was removed by air blow. This membrane was designated as Example 1.

Membranes, which were impregnated with phosphoric acid in the same manner as described above, were prepared as Examples 2 and 3. The amount of addition of imidazole was 0.00025 mol or 0.00051 mol per gram of PBI.

A membrane of PBI impregnated with phosphoric acid in the same manner as in Examples 1 to 3 was prepared as Comparative Example. In this example, imidazole was not added.

The mole number of phosphoric acid per repeating unit of PBI was determined for the respective membranes of Examples 1 to 3 and Comparative Example manufactured as described above. First, disk-shaped test pieces each having a diameter of 30 mm were cut out from the obtained membranes.

Subsequently, each of the disk-shaped test pieces was immersed in 150 ml of pure water. The agitation was performed for 5 minutes to elute phosphoric acid contained in the membrane into pure water to obtain an aqueous solution. The aqueous solution was titrated with 0.02 N aqueous sodium hydroxide solution to obtain the mole number of eluted phosphoric acid, in other words, phosphoric acid immersed in the membrane was determined.

On the other hand, the membrane was taken out from the aqueous solution after the titration. The membrane was washed with pure water, and then it was dried in a vacuum dryer. The mole number of phosphoric acid per repeating unit of PBI was calculated from the mass of the membrane after the drying, the mole number of phosphoric acid with which the membrane had been impregnated, and the molecular weight (308) of the repeating unit of PBI. As a result, obtained values were 12.7, 12.9, 12.9, and 12.9 for the membranes of Examples 1 to 3 and Comparative Example in this order. That is, the mole numbers of phosphoric acid per repeating unit of PBI were substantially equivalent in the respective membranes.

Figure 2:
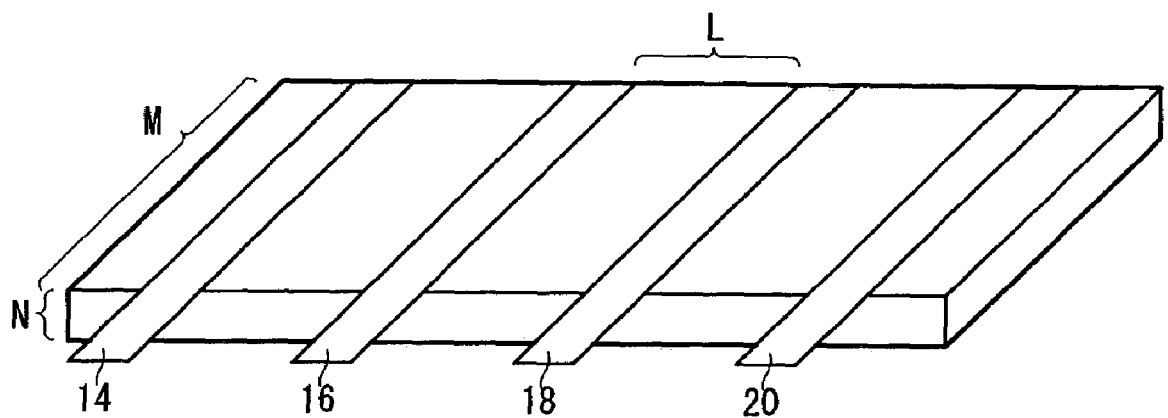
FIG. 2 is a perspective view schematically illustrating an entire state in which electrodes are connected to test pieces in order to measure the proton conductivity.

Separately from the above, the proton conductivity was evaluated for each of the membranes of Examples 1 to 3 and Comparative Example. Specifically, as shown in FIG. 2, test pieces 12 each having a size of 10 mm×30 mm were cut out from the respective membranes of Examples 1 to 3 and Comparative Example. A working electrode 14, a first reference electrode 16, a second reference electrode 18, and a counter electrode 20 were joined to each of the test pieces 12.

The electrodes 14, 16, 18, 20 were electrically connected to Impedance Analyzer S-1260 produced by Solartron to measure the DC resistance component of each of the test pieces 12 at 160° C. based on the AC complex impedance method. The proton conductivities δ (unit: S/cm) were determined from the respective results of measurement in accordance with the following expression A. In the expression A, N represents the membrane thickness, M represents the width, L represents the distance between the electrodes, and R represents the resistance.

$$\delta = \frac{L}{R \cdot M \cdot N} \quad (A)$$

All of the results are shown in FIG. 3. According to FIG. 3, it is clear that the proton conductivities δ of the membranes of Examples 1 to 3 are higher than that of the membrane of Comparative Example. As described above, the mole numbers of phosphoric acid per repeating unit of PBI are substantially equivalent in the respective membranes. Therefore, the reason, why the proton conductivity δ is improved, is that imidazole is added and dispersed in PBI (basic solid polymer).

As explained above, according to the proton conductive solid polymer electrolyte concerning the present invention, the movement of proton is assisted by the lone pair of the lone pair material dispersed in the basic solid polymer. Accordingly, it is possible to obtain the conductor which is excellent in proton conductivity.

The proton conductive solid polymer electrolyte as described above can be utilized, for example, as the solid electrolyte of the fuel cell. In this case, the proton is promptly moved from the anode to the cathode, and hence it is possible to improve the power generation characteristics of the fuel cell.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A proton conductive solid polymer electrolyte comprising a basic solid polymer as a base material, said base material being impregnated with an acidic inorganic liquid, wherein:
   a material, which has at least one lone pair, is dispersed in said base material; and
   a mole number of said material per gram of said base material is less than 0.0014 mol.

2. The proton conductive solid polymer electrolyte according to claim 1, wherein said solid polymer as said base material is a polymer which has a structural unit of secondary amine monomer.

3. The proton conductive solid polymer electrolyte according to claim 2, wherein said polymer, which has said structural unit of said secondary amine monomer, is at least one polymer selected from the group consisting of polymers represented by the following chemical formulas (1) to (4):

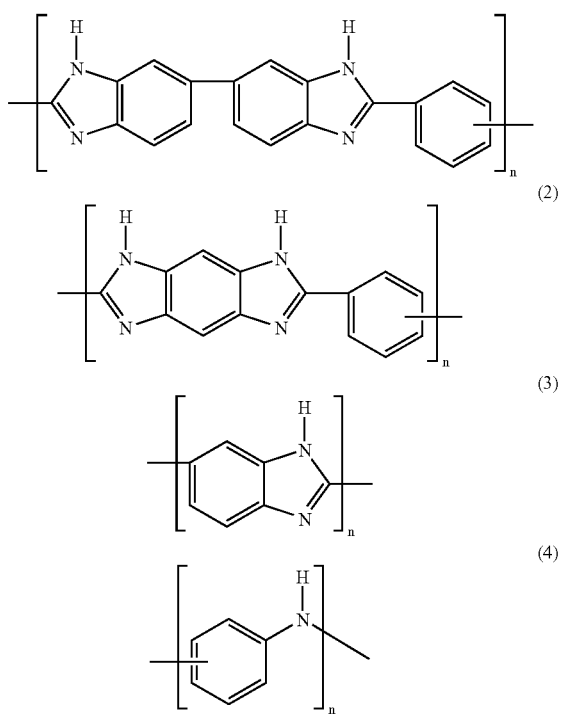

4. The proton conductive solid polymer electrolyte according to claim 3, wherein said polymer, which has said structural unit of said secondary amine monomer, is polybenzimidazole.

5. The proton conductive solid polymer electrolyte according to claim 1, wherein said material is at least one material selected from the group consisting of compounds having at least one nitrogen-containing heterocyclic compound group, compounds having at least one amino group, compounds having at least one imino group, and nitrogen-containing heterocyclic compounds.

6. The proton conductive solid polymer electrolyte according to claim 5, wherein said material is a compound having said nitrogen-containing heterocyclic compound group.

7. The proton conductive solid polymer electrolyte according to claim 6, wherein said nitrogen-containing heterocyclic compound group is imidazole group, pyrazole group, or pyridine group.

8. The proton conductive solid polymer electrolyte according to claim 7, wherein said compound having said nitrogen-containing heterocyclic compound group is at least one compound selected from the group consisting of polyvinylimidazole, polyvinylpyrazole, and polyvinylpyridine.

9. The proton conductive solid polymer electrolyte according to claim 5, wherein said material is said compound having said imino group.

10. The proton conductive solid polymer electrolyte according to claim 9, wherein said compound having said imino group is polyethyleneimine.

11. The proton conductive solid polymer electrolyte according to claim 5, wherein said material is said nitrogen-containing heterocyclic compound.

12. The proton conductive solid polymer electrolyte according to claim 11, wherein said nitrogen-containing heterocyclic compound is at least one compound selected from the group consisting of imidazole, pyrazole, pyridine, diazine, quinoline, isoquinoline, indole, and purine.

13. The proton conductive solid polymer electrolyte according to claim 1, wherein said acidic inorganic liquid is phosphoric acid or sulfuric acid.

14. The proton conductive solid polymer electrolyte according to claim 1, wherein said mole number of said material per gram of said base material is less than 0.0006 mol.

* * * * *